Nov. 25, 1969    JAY H. PRAGER    3,479,898
MULTIPLE SELECTION CONTROL STRUCTURE
Filed Jan. 13, 1969
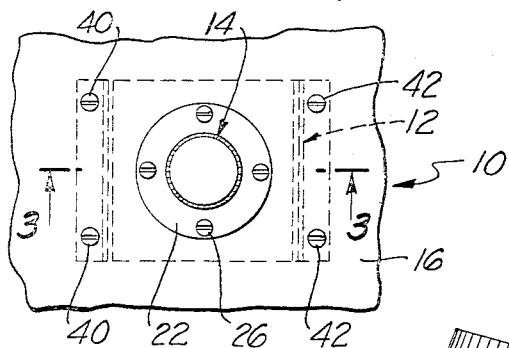
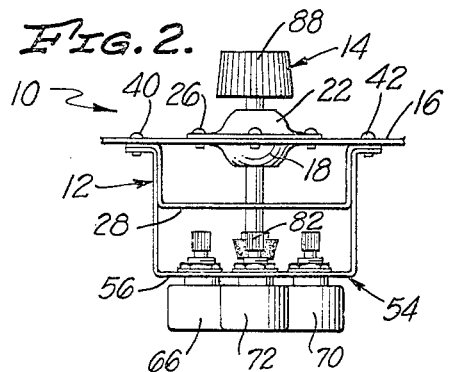
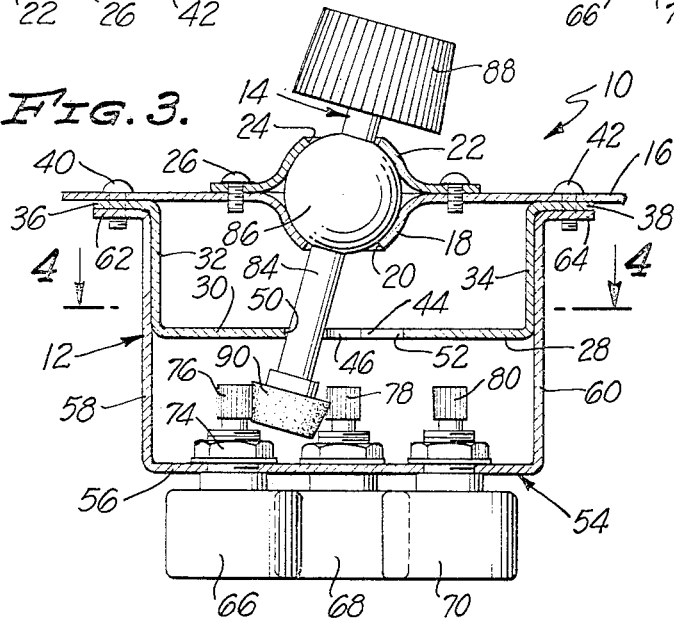
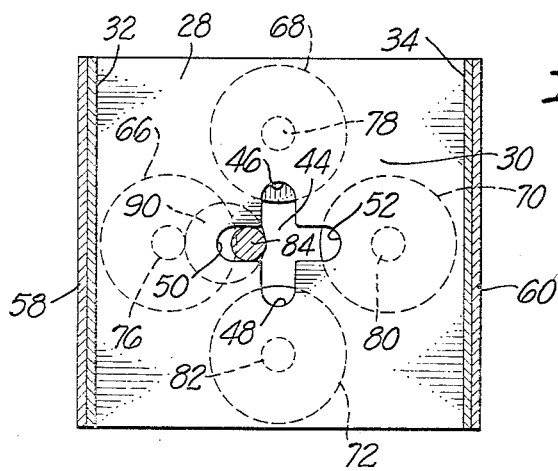
INVENTOR
JAY H. PRAGER
BY
EDWARD D. O'BRIAN
ATTORNEY

United States Patent Office 3,479,898
Patented Nov. 25, 1969

3,479,898
MULTIPLE SELECTION CONTROL STRUCTURE
Jay H. Prager, 25–11, 6-chome, Nishigotanda,
Shinagawa-ku, Tokyo, Japan
Substituted for abandoned application Ser. No. 571,099,
Aug. 8, 1966. This application Jan. 13, 1969, Ser. No.
796,942
Int. Cl. F16h *35/18, 13/10;* G05g *9/02*
U.S. Cl. 74—471                                3 Claims

ABSTRACT OF THE DISCLOSURE

The multiple selection control structure of this invention comprises the single manually operable control element which can be moved in a first mode to select and engage a structure to be controlled, and then moved in a second mode so as to adjust or move the controlled structure. With a multiple selection in the first mode, the control element can selectively engage any one of a plurality of structures which can be adjusted, and thus a single manually operable control element can select and adjust a plurality of control devices or structures.

More specifically, the multiple selection control device of this invention comprises a universally and rotatably mounted control element which is primarily a shaft. The control shaft is arranged with a manual handle on one end and a drive means on the other. The drive means can be selectively moved into engagement with any one of a plurality of devices which can be adjusted, for example, potentiometers and variable capacitors. After the engagement is complete, rotation of the control knob and shaft adjusts the device to be controlled. The control shaft can either be restricted to engage one controllable device at a time, or may be arranged so that it can contact two of them.

Cross-references to related applications

This application is a substitute for the prior application Ser. No. 571,099, filed Aug. 8, 1966, now abandoned. This application is identical with this prior application except that the claims of the prior application have not been reproduced but have been replaced by claims 1, 2 and 3 corresponding to the allowed claims 11, 12 and 13 of this prior application.

Background of the invention

Most of the pieces of modern electronic equipment have many individual controls. They are usually located in an accessible place on the equipment so that each of the independent controls can be reached and individually adjusted. Individual adjustment, for each of the controls usually adjusts an independent variable. Occasionally, controls are ganged. For example, an on-off switch is sometimes ganged with a volume control potentiometer. However, this ganging destroys the independent variability of the separate controls. In some installations this great plurality of controls is undesirable, but little has been previously done to simplify control panels. This invention is aimed at simplifying these multiple independent control knobs.

Summary of the invention

It is thus an object and advantage of this invention to provide a multiple selection control structure which is capable of individually, selectively controlling or adjusting devices so that a single manually operable control knob can control individual devices so that each continues to retain its independent variability. It is a further object and advantage of this invention to provide a single manual control handle which can be moved in a first mode to select which of a plurality of different independent adjustable structures will be adjusted, and moved in a second mode to adjust that structure. At the same time the other independent variable adjustable structures are not adjusted so that they maintain their independence.

It is a further object and advantage of this invention to simplify a control panel so that a single control knob on the panel can be used to select and adjust any one of a plurality of different adjustable devices.

Brief description of the drawing

Other objects and advantages of this invention will become apparent from a study of the following portion of this specification.

FIG. 1 is a top plan view of the multiple selection control device of this invention;

FIG. 2 is a front elevational view thereof;

FIG. 3 is an enlarged section taken generally along the line 3—3 of FIG. 1;

FIG. 4 is a section taken generally along the line 4—4 of FIG. 3.

Description of the preferred embodiment

Referring now to the drawings, the multiple selection control structure is generally identified at 10. The structure 10 comprises frame 12 and control element 14.

Frame 12 comprises front plate 16 which may be a part of the structure in which the entire multiple selection control structure 10 is a part, or may be a panel which may be inserted into an appropriate opening therein. Front plate 16 has a hemispherical depression 18 therein. Opening 20 in the bottom of depression 18 is moderately large so as to permit angular motion of control element 14, as is indicated in FIG. 3. Cover plate 22 is also hemispherically domed, complementary to hemispherical depression 18, and has opening 24 therein. Cover plate 22 is secured to front plate 16 by any convenient means such as screws 26.

Lock plate 28 has a substantially planar central section 30 which is positioned below top plate 16, and substantially parallel thereto. Central section 30 has upwardly extending legs 32 and 34 which terminate in feet 36 and 38 secured against the underside of front plate 16. This securement may be accomplished by screws 40 and 42. Opening 44 is formed substantially centrally of central section 30. Opening 44 is formed by two slots which intersect substantially at their centers. Thus, a cross is formed. The slots have ends 46, 48, 50 and 52.

Support plate 54 similarly has a central section 56 which is substantially planar and substantially parallel to front plate 16. The central section serves as a supporting area, as is hereinafter described. Support plate 54 has legs 58 and 60 extending upwardly therefrom and adjacent legs 32 and 34. Similarly, it has feet 62 and 64 which may also be retained with respect to front plate 16 by means of screws 40 and 42. The supporting area, or central section 56 of support plate 54 has suitable openings therein for the supporting of devices which are to be controlled in the multiple selection control structure of this invention. Illustrated are four cans which may be potentiometers, switches, variable capacitors or the like. The control devices are illustrated only generally, for it is clear that other types of control devices can be used in this invention.

In the preferred use of this invention, it is useful to eliminate the multiple control knobs on the front of electronic panels. And thus, the components being controlled are preferably electronic components. However, mechanical devices could be controlled by this structure, should such be desired. As is seen in FIGS. 2, 3 and 4, electrical devices 66, 68, 70 and 72 are shown. The electrical devices are fastened through holes in support plate 54 and are retained therein by nuts, such as nut 74. Each of the devices has an upstanding shaft, which is preferably longitudinally serrated, knurled or otherwise has a friction surface thereon. These shafts are illustrated at 76, 78, 80 and 82.

Control element 14 comprises a central shaft 84 which is mounted in ball 86. Ball 86 is in turn mounted within the socket formed by the hemispherical depression 18 and the cover plate 22. Shaft 84 passes through openings 20 and 24 therein. The upper end of shaft 84, as is seen in FIG. 3, carries manually operable knob 88 secured thereto. Shaft 84 passes through opening 44 in lock plate 28 and carries on its lower end drive wheel 90. Drive wheel 90 is preferably of elastic friction material such as rubber. Drive wheel 90 is fixed to shaft 84. Shaft 84 is either rotatable in ball 86, or ball 86 is sufficiently loosely held in its socket that it can rotate therein on the axis of shaft 84. Similarly, ball 86 is sufficiently loosely held in its socket so that ball 86 can be rocked therein with the shaft 84 passing from one end of one of the slots in opening 44 to another end. Thus, control element 14 is operated in a first mode of rocking which is controlled by the shape of opening 44 and in a second mode of rotation about the axis of shaft 84. It is clear that other types of universal mountings can alternately be employed.

When the control element 14 is operated in its first mode, the shaft 84 moves toward one end of one of the slots of the opening 44 in the lock plate, for example the end 50 as shown in FIGS. 3 and 4. In this position drive wheel 90 is brought against shaft 76 by operation of the control element 14 in the first mode. Now, upon rotation of the control element 14, the second mode of operation, the drive wheel 90 rotates shaft 76 to adjust the control device or adjustable structure 66. After the adjustment is completed, the control element 14 may be left where it is, may be moved to the central position or may be moved to adjust one of the other controlled electrical devices or adjustable structures. To do this, the shaft 14 is simply rocked in its first mode toward another one of the slot ends and against the appropriate shaft to be in engagement therewith. Thereupon, by rotating the shaft the second device is adjusted.

If desired, detent means may be provided in the opening 44 so as to maintain drive wheel 90 in engagement with the particular shaft with which it is in engagement by motion upon the first mode. This detent device can be simply a small spring in each of the slots. For appearance purposes, the manual knob 88 can be made with a substantially larger skirt so as to cover cover plate 22 and its holding screws. Furthermore, it is clear that while four control devices or adjustable structures are shown in the drawing, any reasonable number from two up can be provided and adjusted by the multiple selection control structure of this invention. Furthermore, the lock plate 28 with its opening 44 provides a convenient way to direct the control element 14 into the proper position and maintain it while it is being rotated. However, should this limited motion of control element 14 be considered undesirable, the lock plate can be left out. This has an advantage in some structures, for when the shafts of the control devices are sufficiently close, the drive wheel 90 may engage two of such shafts at the same time to perform two adjustments at the same time. However, this is considered less desirable than controlling the position of control element 14 by means of the opening 44 in lock plate 28.

This invention having been described in its preferred embodiment, it is clear that it is susceptible to numerous modifications and changes within the skill of the routine artisan and without the exercise of the inventive faculty. Accordingly, the scope of this invention is defined by the scope of the following claims.

What is claimed is:
1. A multiple-selection control structure which comprises:
   a frame having an inside and an outside,
   a spherical socket located on said frame, said socket having opposed openings, one of which leads to the outside of said frame and the other of which leads to the inside of said frame,
   a ball located within said socket so as to be held thereby in such a manner so as to be capable of being rotated,
   a control shaft extending through said ball, said socket and said openings from the outside of said frame to the inside of said frame,
   a knob located on the extremity of said control shaft on the outside of said frame,
   a friction drive wheel located on the extremity of said control shaft within said frame,
   a support located within said frame so as to be located adjacent to and spaced from said drive wheel,
   a plurality of separate control elements mounted on said support,
   each of said control elements including a shaft extending therefrom and a friction surface located on each of said shafts,
   said control elements being positioned so that each of said friction surfaces is capable of being engaged by said friction drive wheel upon movement of said control shaft and is capable of being rotated by engagement with said friction wheel when said knob is rotated.
2. A multiple selection control structure as claimed in claim 1 including:
   means for directing said control shaft into different positions in each of which positions said friction drive means engages the friction surface on one of said shafts.
3. A multiple selection control structure as claimed in claim 2 wherein:
   said means for directing comprises a plate located between said frame and said control elements,
   said plate having an opening located therein, including slots corresponding to each of said control elements,
   said control shaft being capable of fitting into said slots.

References Cited
UNITED STATES PATENTS

| | | |
|---|---|---|
| 169,383 | 11/1875 | Starr. |
| 1,660,278 | 2/1928 | Schwarze _____ 74—10.45 |
| 1,763,690 | 6/1930 | Edgar et al. _____ 74—523 |
| 2,855,516 | 10/1958 | Lyman et al. _____ 74—10.45 |
| 3,103,127 | 9/1963 | Hartop _____ 74—471 |

FRED C. MATTERN, Jr., Primary Examiner
CAROLYN F. GREEN, Assistant Examiner

U.S. Cl. X.R.
74—10.45, 213